Dec. 18, 1956 S. W. GRISELLE 2,774,405

KEY CASE

Filed Aug. 1, 1955

INVENTOR:
Sherman W. Griselle,
BY
Dawson, Tilton & Graham,
ATTORNEYS.

United States Patent Office 2,774,405

Patented Dec. 18, 1956

2,774,405

KEY CASE

Sherman W. Griselle, Chicago, Ill.

Application August 1, 1955, Serial No. 525,424

6 Claims. (Cl. 150—40)

Figures 1, 2, 3, 4:
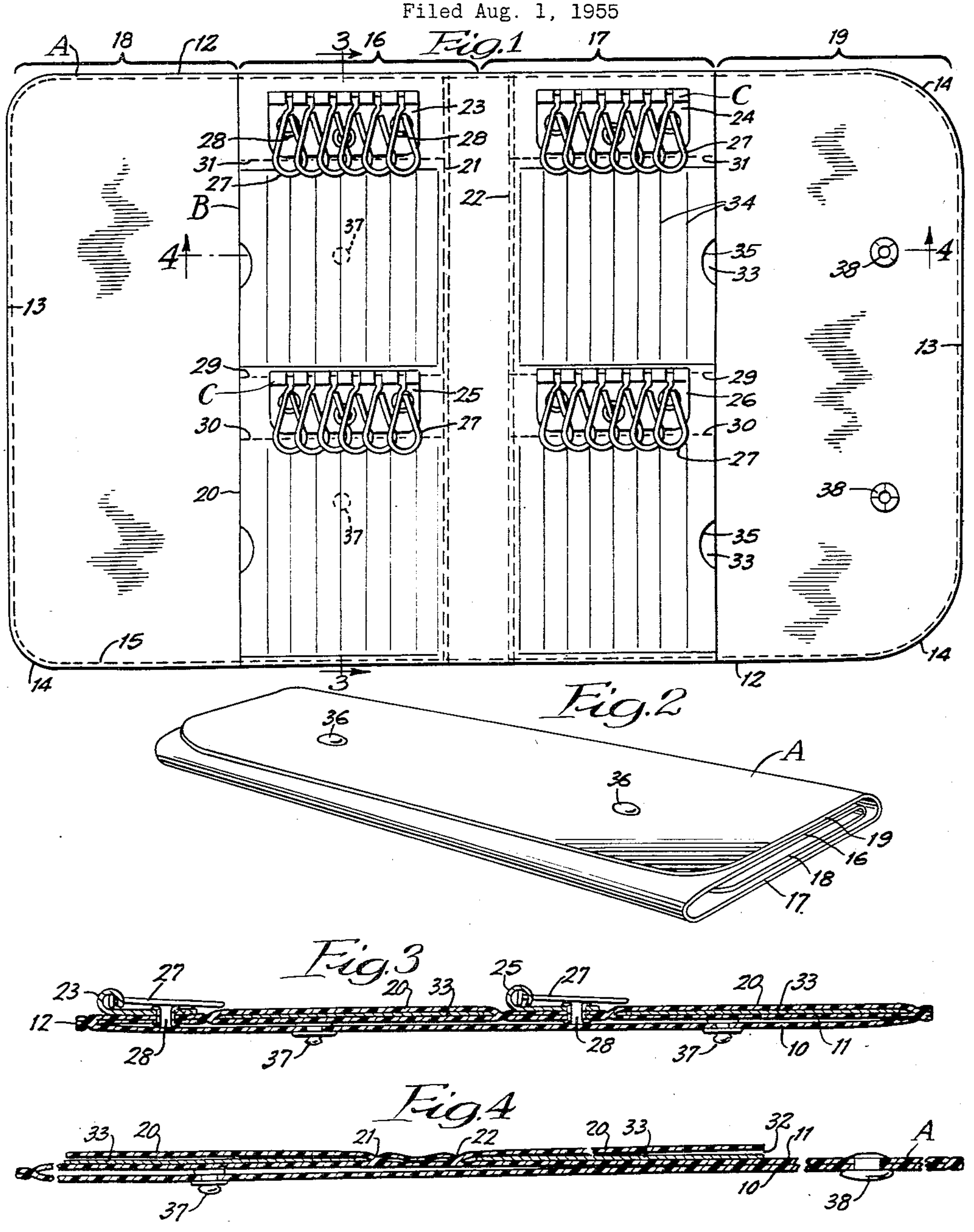

This invention relates to key cases, and more specifically to a compact, folding case particularly useful for filing and storing a quantity of keys.

In most households, there are usually a number of spare keys, duplicate keys and other keys which are seldom used and which are either scattered in various places throughout the house or are kept in disorganized fashion upon a shelf, in a drawer, etc. Quite frequently, one or more of these keys becomes misplaced or lost or cannot be easily identified among a group of keys having the same general appearance. Since keys stored in the usual disarranged fashion are seldom marked or labeled, it is often necessary to try a number of keys in a rarely operated lock before the proper key is found, if at all. While tagging aids in identifying infrequently used keys, there is still the likelihood that the one key which is needed at any particular moment may have remained untagged, or if tagged may have become separated from the group of keys and become lost.

Therefore, one of the main objects of the present invention is to overcome the aforementioned difficulties by providing a compact file case for storing a large number of keys. Another object is to provide a file case for keys wherein any one of a number of keys stored therein may be easily and quickly identified. A further object is to provide a foldable plastic key case in which rows of keys may be maintained in orderly fashion as the case is folded and during the storage thereof. An additional object is to provide a plastic key case in which rows of keys may be separated from each other when the case is folded and closed. A still further object is to provide a flexible and foldable key case formed from laminated sheets of a thermoplastic material which are secured to each other along heat-sealed lines, and lines also acting to stiffen the case and define the folds thereof.

Other objects and advantages will appear from the specification and drawing, in which:

Figure 1 is a top plan view of an open or unfolded case embodying the present invention; Figure 2 is a perspective view of the key case in folded condition; Figure 3 is a sectional view taken along line 3—3 of Figure 1; and Figure 4 is a sectional view taken along line 4—4 of Figure 1.

The key case shown in the drawing essentially comprises a cover generally designated by the letter A, a lining indicated by the letter B and a plurality of key-holding assemblies represented by the letter C. Cover A and lining B are composed of a flexible material and, for reasons which will presently appear, are preferably formed from sheets of a thermoplastic material such as cellulose acetate, vinyl acetate, polyethylene, polystyrene or polytetrafluoroethylene polymer. While I have found these materials to be particularly suitable, however, it will be appreciated that other plastic or thermoplastic sheet materials may be used in conjunction with the present invention.

As shown best in Figure 4, cover A is of laminated construction and is formed from a pair of plastic sheets. The outside sheet 10 and the inside sheet 11 have the same general dimensions. Both sheets are elongated and have a generally rectangular shape. The two sheets are joined together along their side, end and corner edges 12, 13, and 14, respectively. If the sheets 10 and 11 are of a thermoplastic material, then I prefer to heat-seal them together along a line 15 extending about their periphery. Electronic heat-sealing methods are well known in the art, so that a description herein is believed unnecessary.

For purposes of clarity, the elongated cover A will be described as comprising four transversely extending quarter sections. That is, two inner sections 16 and 17 adjacent each other, and two outer sections 18 and 19 at opposite ends of the cover. As shown in Figure 1, the sections extend vertically between opposite edges 12 and have substantially the same horizontal dimensions. Each of the sections or panels is adapted to be folded over the next adjacent section, as will be described shortly.

Over inner sections 16 and 17 is mounted a transparent lining 20 formed from a clear flexible material. This lining is preferably a clear thermoplastic sheet which is sealed upon the cover sheet 11 along vertical and horizontal lines. Vertical heat-sealing lines 21 and 22 extend between opposite edges 12 of the cover, and lie in parallel spaced apart relation along adjacent portions of inner sections 16 and 17. While the transparent lining might be independently sealed upon cover A by separate horizontal or longitudinal heat-sealing lines along side edges 12, I prefer to secure the edges of the cover sheets 10 and 11 and at the same time seal lining 20 to the cover along the single sealing line 15. Therefore, sheets 10, 11 and 20 are all joined together at the edges 12 of cover A along heat-sealing lines 15.

The key-holding assemblies C are generally conventional and consist of connecting plates 23, 24, 25 and 26 which are turned or rolled along one edge, and are slotted to receive the enlarged ends of a plurality of swivel key hooks 27. Each key hook is formed from a spring metal, such as tempered steel, and is adapted to hold one or more keys. Since the construction of the key-holding assemblies is conventional and well understood in the art, it is believed that a more detailed description of these assemblies is unnecessary here. To provide adequate key storage capacity, I have found it desirable to provide the key case with four sets of key assemblies, each having six key hooks, although it will be readily seen that a greater or a smaller number of assemblies and hooks might be provided.

The key assemblies are mounted upon the cover A by any suitable means, such as by rivets 28. It is to be noted that the rivets for each of the key assemblies passes through the inside sheet 11 of cover A, through the transparent lining sheet 20 and through the connecting plates 23, 24, 25 and 26. Therefore, the key assemblies are securely fastened upon the cover A without extending through the outside sheet 10, and without being visible on the outside surface of the case.

As shown best in Figures 1, the key-holding assemblies are riveted in pairs upon each of the inner sections 16 and 17 of the cover, so that there are a pair of longitudinal or horizontal columns of normally vertically extending key hooks upon each of these sections. In the illustration given, two of the connecting plates 23 and 24 are mounted adjacent edge 12 of the cover, while the remaining two plates 25 and 26 extend longitudinally and at an equal distance from the first mentioned plates and the opposite side edge of the cover. On each side of connecting plates 25 and 26 are parallel and longitudinally extending heat-sealing lines 29 and 30. Also, adjacent each connecting plate 23 and 24 is a longitudinally extending heat-sealing line 31. These heat-sealing lines 29, 30 and 31 not only aid in securing lining sheet 20 upon cover sheet 11, but in combination with the transversely extending sealing lines 21 and 22 and sealing line 15, define a plurality of pockets 32. As best seen in Figures 1 and 4, these pockets have their openings facing outer sections 18 and 19, and are adapted to receive indicia bearing cards 33. These key identification cards may be easily inserted into and removed from pockets 32, and preferably carry markings or lines 34. As in aid to removing the cards and making them more accessible, arcuate portions of the transparent lining 20 may be cut away or notched along edge 35.

In folding or closing the case, outer section 18 of the cover is first drawn over the next adjacent section 16. Sections 16 and 18 are then folded along a transverse fold line extending between the parallel sealing lines 21 and 22, so that the key-holding assemblies are brought into alignment in facing relation and are separated from each other only by the outer section 18 of the cover. It is believed apparent that during the folding operation, section 18 acts to maintain the key hooks upon inner section 16, and any keys mounted thereon, in a normally vertical position so that they will not entangle the hooks and keys mounted upon inner section 17, or interfere with the folding and closing of the case. Finally, outer section 19 is brought over the folded sections 16, 17 and 18 and into the position shown in Figure 2.

To secure the case in closed condition, I provide cover A with a pair of snap fasteners indicated generally by the numeral 36. Each fastener has a male and a female portion 37 and 38 respectively. The male portions of the snaps are located upon inner section 16 of the cover, and are secured only to the outside sheet 10 thereof, as illustrated in Figures 3 and 4. The female portions 38 are mounted upon outer section 19 of the cover and, as seen best in Figure 4, preferably extend through both thicknesses of the cover. When the cover is then folded, these portions of the fasteners are snapped together in the usual manner, and maintain the case in closed condition.

When the case is closed, outer section 18 is interposed between the key assemblies of the two inner sections, and provides a partition for keeping keys carried by these assemblies in separated and arranged condition. Should it be necessary to use one of the keys carried by the key-holding assemblies, the user need only unsnap the case and glance at the indicia bearing cards adjacent the key assemblies to identify the particular key which is needed. The identified key may then be easily removed or detached from the hook upon which it is mounted. Since the case is formed from a flexible plastic material, and since the swivel hooks allow a key to be lifted and turned independently from the case, I have found that where a particular key is needed only for a temporary purpose, it may be convenient to use the key while it is still attached to the case.

When additional keys are mounted within the case, the identification card adjacent the assembly holding the key may be withdrawn from its pocket and appropriate words identifying the key may be placed between the lines corresponding to the particular hook upon which the key is secured. The indicia bearing cards, therefore, provide a means for quickly and easily identifying spare keys or infrequently used keys whenever they are needed.

The present key case is particularly suitable for filing and storing a large number of keys because of the double thickness of cover A, the reinforcement provided by lining 20 and the stiffening effect produced by the transverse and longitudinal heat-sealing lines securing lining 20 to the cover. These sealing lines contribute in a large part toward maintaining the shape and contour of the case despite the fact that a large number of keys may be carried therein.

While I have described my invention in considerable detail for purposes of illustration, it will be understood by those skilled in the art that many of these details may be varied without departing from the spirit and scope of this invention.

I claim:

1. A key case having a cover comprising a pair of laminated flexible plastic sheets joined together along the peripheral edges thereof, said cover having a pair of transversely extending inner sections adjacent each other and a pair of transversely extending outer sections at opposite ends thereof, at least one key-holding assembly being mounted upon each of said inner sections and providing a longitudinal series of transversely extending swivel key hooks adapted to hold a plurality of keys, a transparent sheet of flexible plastic being mounted upon said inner sections and interposed between said inner sections and said key-holding assemblies, said transparent sheet being secured to said inner sections along transverse lines extending along adjacent portions of said inner sections, and along longitudinally extending lines on opposite side edges of said inner sections and adjacent said series of key-holding assemblies, said outer and inner sections being foldable along transverse fold lines extending between said sections for bringing said series of key-holding assemblies into facing alignment with one of said outer sections interposed therebetween, and fastening means for securing said sections in folded relation.

2. The structure of claim 1 in which said key-holding assemblies are mounted upon said inner sections by means of rivets which extend through said assemblies and through only one of said laminated plastic sheets of said cover.

3. The structure of claim 1 in which said transparent sheet and said inner sections of said cover provide pockets therebetween adjacent said key-holding assemblies, said pockets being defined by said transversely and said longitudinally extending lines securing said transparent sheet to said cover, and key identification cards being removably mounted within said pockets for identifying keys held by said assemblies.

4. A key case having a cover comprising a pair of laminated flexible sheets being joined together along the peripheral edges thereof, said cover having a pair of transversely extending inner sections adjacent each other and a pair of transversely extending outer sections at opposite ends thereof, a pair of key-holding assemblies, each being mounted upon one of said inner sections, said outer and inner sections being foldable along transverse fold lines extending between said sections for bringing said key-holding assemblies into facing alignment with one of said outer sections interposed therebetween, and fastening means for securing said sections in folded relation.

5. A key case having a cover comprising a pair of laminated flexible thermoplastic sheets sealed together along their peripheral edges, said cover having a pair of vertical inner sections adjacent each other and a pair of vertical outer sections at opposite ends thereof, at least one pair of key-holding assemblies, each being mounted upon one of said inner sections, each of said assemblies comprising a horizontal series of normally vertically extending swivel key hooks, said inner sections being lined with a transparent thermoplastic sheet interposed between said inner sections and said key-holding assemblies, said transparent sheet being sealed upon said inner section along a pair of vertically extending sealing lines and along horizontally extending sealing lines at opposite edges of said cover and adjacent said series of swivel key hooks, said inner and outer sections being foldable along vertical fold lines extending between said sections for bringing said key-holding assemblies into facing alignment with one of said outer sections interposed therebetween, and fastening means for securing said sections in folded relation.

6. The structure of claim 5 in which said vertical sealing lines are spaced apart and extend between opposite edges of said cover and along adjacent portions of said inner sections.

References Cited in the file of this patent

UNITED STATES PATENTS 1,712,777 Samson ---------------- May 14, 1929